June 24, 1930.    C. T. SIEBS    1,765,460
SYSTEM OF ELECTRICAL DISTRIBUTION
Original Filed Nov. 26, 1927    2 Sheets-Sheet 2
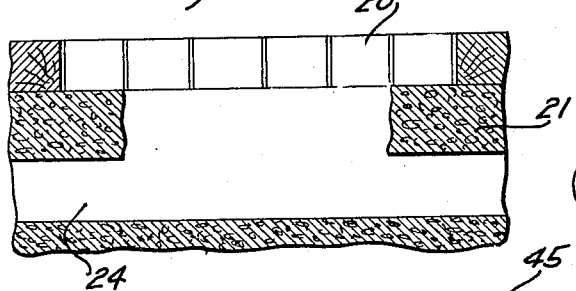
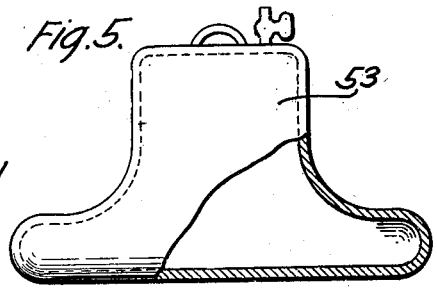
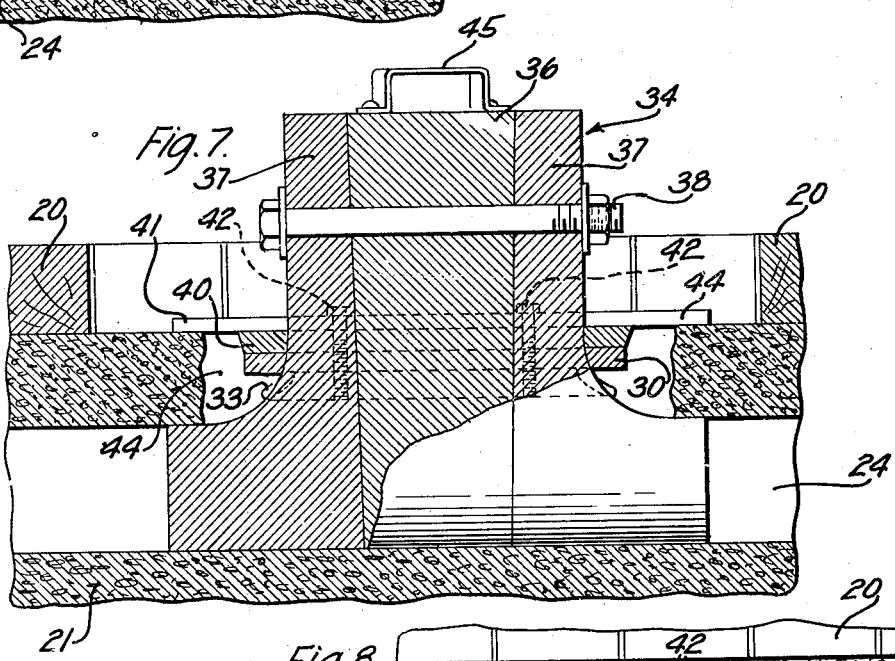
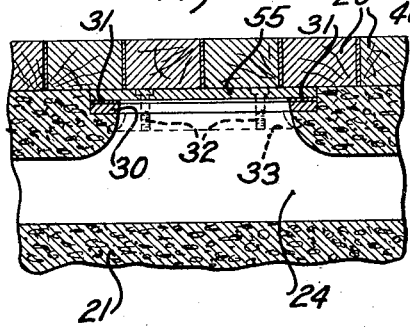
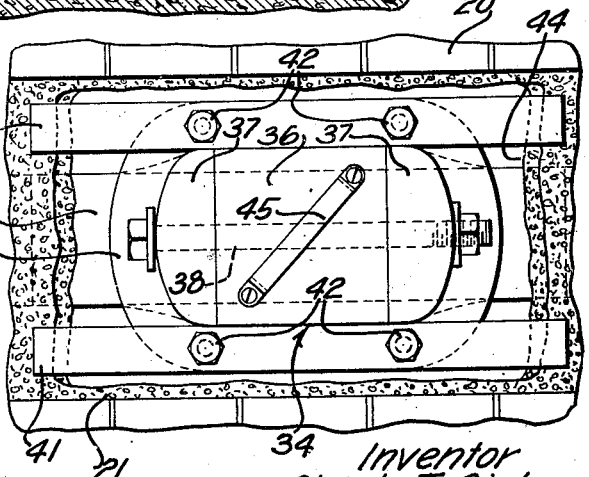
Inventor
Claude T. Siebs Patented June 24, 1930

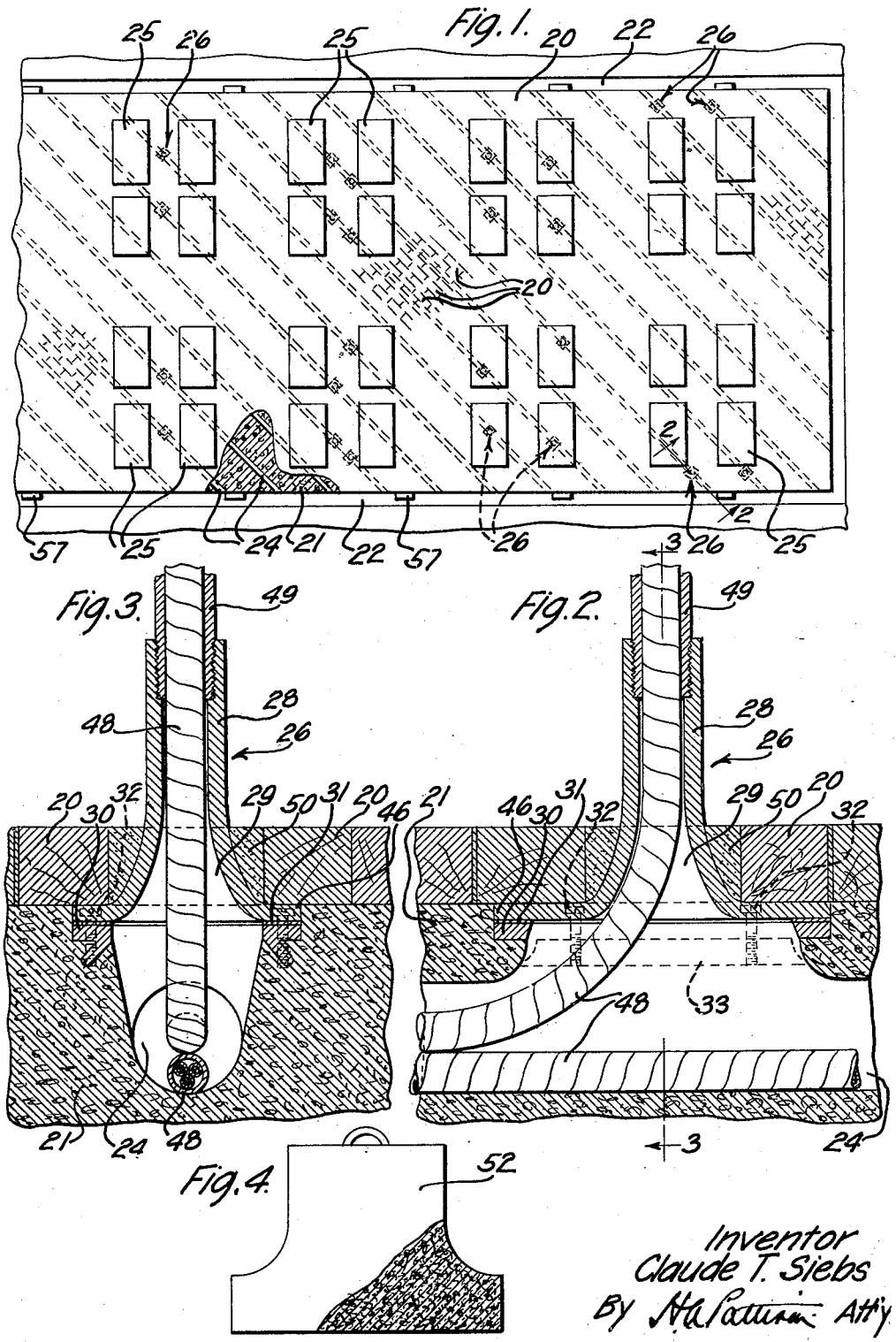

1,765,460

UNITED STATES PATENT OFFICE

CLAUDE THEODORE SIEBS, OF CRANFORD, NEW JERSEY, ASSIGNOR TO WESTERN ELECTRIC COMPANY, INCORPORATED, OF NEW YORK, N. Y., A CORPORATION OF NEW YORK

SYSTEM OF ELECTRICAL DISTRIBUTION

Original application filed November 26, 1927, Serial No. 235,829. Divided and this application filed February 23, 1929. Serial No. 341,967.

This invention relates to a system of electrical distribution, and more particularly to a system for distributing electrical conductors within concrete floor slabs and the like, and is a division of my copending application Serial No. 235,829, filed November 26, 1927, for Systems and methods of electrical distribution.

In the construction of concrete floors and the like, it has heretofore been the practice in some cases to mold a system of passageways in the concrete of the floor for the purpose of subsequently receiving electrical conductors for connecting motors, telephones, or other electrical devices to a source of current. In instances where a plurality of motor-driven machines, for example, are to be mounted in spaced relation upon a floor, it is often difficult to determine, prior to the laying of the floor, the position each machine will occupy, and it is frequently necessary to subsequently move such machines from one location to another, so that a system which was designed for the original layout may not be at all satisfactory for the machines in their changed positions. It is therefore desirable to provide a system of passageways in the floor slabs of such a nature that outlets may be readily formed at any point thereof, and so disposed that electrical apparatus located at any point on the floor may be served by the use of a minimum amount of wiring.

The primary object of this invention is to provide a simple and economical system of distribution for electrical conductors.

In accordance with the general features of the invention a system of floor construction which represents one embodiment of the invention may be employed which includes a plurality of parallel passageways molded within the concrete floor slab and angularly disposed with respect to terminal trenches along the margin of the floor. A portion of the slab is removed when a machine upon the floor is to be wired, after which an outlet passageway is formed in the concrete. The angular arrangement of the passageways permits a machine or other apparatus located on the floor to be connected to the passageway by the use of a minimum amount of wiring.

The above and other objects will be apparent from the following detailed description taken in connection with the accompanying drawings, wherein Fig. 1 is a diagrammatic plan view of a floor area disclosing the arrangement of parallel passageways and various positions of the floor outlets for serving machines;

Fig. 2 is a fragmentary vertical sectional view taken on the line 2—2 of Fig. 1, disclosing an outlet assembly associated with a passageway within the floor slab;

Fig. 3 is a vertical sectional view taken on the line 3—3 of Fig. 2;

Fig. 4 is a side elevational view shown partly in section of a resilient form for molding an outlet;

Fig. 5 is an inflatable form for molding a floor outlet;

Fig. 6 discloses the first step in the method of removing a portion of the floor slab preparatory to the molding of a floor outlet;

Fig. 7 discloses a collapsible form and an outlet anchor member associated with the floor slab after the initial step of breaking through the slab as shown in Fig. 6 has been completed;

Fig. 8 is a plan view of the positioned collapsible form and anchor member shown in Fig. 7, and Fig. 9 discloses a covering plate in position to seal the floor outlet after the removal of the outlet casting.

Referring now to the drawings wherein like numerals have been employed to designate similar parts throughout the various figures, it will be observed that Fig. 1 discloses a room provided with a floor which constitutes an upper layer of wooden floor blocks 20 resting upon a concrete slab 21. Along the margins of the floor are terminal trenches 22 and extending through the concrete slab 21 at an angle of substantially 45° with respect to the trenches is a plurality of unlined passageways 24 which are arranged in parallelism and terminate in the trenches. These passageways 24 may be formed within the concrete slab 21 in any convenient manner such, for example, as by molding at the time the floor slab is laid. After the concrete has set, the forms employed in molding these passageways may be removed by engaging each form at the slab margin and exerting a withdrawing force, thus leaving a plurality of straight unlined passageways extending diagonally across the room. A plurality of machines, desks or other apparatus denoted by the numeral 25 and indicated diagrammatically by rectangles in Fig. 1 are positioned in spaced relation upon the floor and the particular arrangement of these machines is shown merely for the purpose of more clearly illustrating the practical application of the invention. A plurality of floor outlet assemblies indicated generally by the numeral 26 are positioned in proximity to the machines 25 and serve to present a convenient conductor outlet for the passageways 24.

These outlet assemblies 26 (Figs. 2 and 3) comprise an outlet casting or conductor guiding and guarding means 28 having a central opening 29 and a sealing gasket 31 interposed between the conductor guide and an anchor plate 30 to which the guide may be conveniently secured by means of screws 32. The anchor plate 30 is provided with flanges 33 which serve when the place is embedded within the concrete slab 21 to firmly retain the assembly in a fixed position.

In order to associate one of the outlet assemblies 26 with one of the previously molded passageways 24 for the purpose of connecting an adjacent machine with electrical conductors, it is first necessary to remove a few of the floor blocks 20 as clearly shown in Fig. 6. A portion of the concrete slab 21 is then removed to present an opening which is sufficient in width to permit the insertion of a collapsible form 34 (Fig. 7). This collapsible form comprises a central section 36 and sections 37 disposed on opposite sides thereof. The lower portions of the sections 37 are cylindrical in shape to conform with the cylindrical cross-section of the passageways 24 and a threaded bolt 38 is adapted to be threaded through apertures provided in the sections 36 and 37 when said sections are properly positioned within the passageway. In introducing the collapsible form within the passageway 24 the sections 37 are first lowered into position and then the central section 36 is interposed between these sections. A filler member 40 conforming in marginal contour with the upper portion of the anchoring plate 30 and a pair of positioning strips 41 (Figs. 7 and 8) are clamped to the anchoring plate by means of screws 42. These assembled parts are then lowered into position over the form 34 until the strips 41 rest upon the upper surface of the concrete slab 21. It will be apparent that the strips 41 together with the spacing or filler member 40 serve to position the anchoring member a predetermined distance below the upper surface of the slab 21 and after the anchoring member has been thus positioned, the clamping bolt 38 may be threaded through registering apertures in the sections 36 and 37 of the form 34 to firmly secure said sections in fixed position. Concrete or cement is then poured around the anchoring plate and filler member so as to completely fill spaces 44 and after the setting of the concrete, the form 34 may be removed by first withdrawing the bolt 38 and then lifting the central section 36 by means of a handle 45 at the upper end thereof. Having removed the member 36 the sections 37 may also be very conveniently withdrawn. The filler member 40 and the strips 41 are then removed by unthreading the bolts 42 and it will be apparent that the filler member may be replaced by the gasket 31 and a flanged portion 46 of the outlet conductor guide 28.

Prior to the association of the outlet guide 28 with the anchoring plate 33, cables or conductors 48 from within the passageways 24 may be passed upwardly through the molded outlet and through the opening 29 within the guide 28. The screws 32 will replace the screws 42 and serve to clamp the outlet guide 28 to the anchoring plate 30 with the upper portion of the flange 42 coplanar with the upper surface of the slab 21. An extension pipe 49 is threaded within the upper end of the outlet guide and this pipe may be of any desired length, depending upon the distance through which the cable 48 must be vertically extended. The floor blocks 20 previously removed for the purpose of molding the outlet are now replaced and the space surrounding the parts of the outlet casting 28 may be filled with pitch 50 or other suitable packing material. From the foregoing it will be clear that the type of outlet just described may be conveniently formed without removing a large portion of the floor materials and the outlet thus formed precludes the possibility of any leakage of moisture from the floor surface into the passageway 24 above which the outlet is constructed.

Various types of collapsible molding forms might be employed in practicing the molding operation, such, for example, as the form 52 disclosed in Fig. 4. This form 52 is constructed of spongy rubber or other resilient material and may be inserted within an opening formed in the slab 21 and removed therefrom without the necessity of dismantling. The removal and insertion of the form 52 is facilated by reason of the fact that the inherent resiliency of the spongy rubber will permit of a temporary distortion thereof in order to introduce and extract the enlarged lower portion of the form. Likewise, as disclosed in Fig. 5, an inflatable resilient molding form 53 might be used to serve in the same capacity and in this instance the form may be easily removed after deflation. All of the molding forms disclosed are of a collapsible nature and therefore are readily adaptable for use in connection with the described molding operations.

In the event that it is found necessary to discontinue the use of one of the outlet assemblies 26, a few of the floor blocks 20 surrounding the outlet guide 28 thereof may be removed and the guide disassembled from its companion anchoring member 30 by unthreading the screws 32. A cover plate 55 (Fig. 9) may then be placed in the space formerly occupied by the flange 46 of the outlet guide 28 and the screws 32 again employed to clamp said plate in covering relation with respect to the molded outlet. The upper surface of the covering plate 55 is flush with the surface of the concrete slab 21 and the floor blocks 20 may be replaced. By having such an arrangement the outlet assemblies 26 may be removed without any resulting permanent mutilation of the floor surface and in the event that an outlet assembly should at a future time again be required at this point, the covering plate 55 may be removed and the apertured cover member or guide 28 repositioned in the convenient manner already described.

From the foregoing it is to be understood that the diagonal arrangement of the parallel passageways 24 is a very important factor in solving the problem of supplying outlet openings for conveniently serving machines, desk and other equipment with electrical conductors regardless of the position of the particular equipment to be served or the particular arrangement of groups of equipment. This fact will be more readily appreciated by referring to the diagrammatic representations disclosed in Fig. 1 wherein a few examples of outlet arrangements are shown. Thus, for example, in the first group of eight machines, beginning at the left of Fig. 1, it will be observed that a single outlet assembly 26 is positioned between each pair of machines, while in the second group from the left of Fig. 1, each machine is provided with an individual outlet assembly. In the next group, it will be observed that the outlet assemblies are positioned directly beneath each machine and the utility of such an arrangement might be more readily understood in connection with supplying outlets for a group of office desks. In such instances it is often desirable to bring the electric wires for telephone service and the like upwardly from beneath the desk and by having the diagonal arrangement of the passageways 24, this problem is conveniently solved. Referring to the fourth or last group of arranged machines to the right of Fig. 1, it will be observed that the outlet assemblies 26 are positioned at each extremity of the group. From the foregoing it will be readily understood that numerous conditions and difficulties incident to the positioning of apparatus upon a floor area which relate to the provision of suitable outlet openings may be overcome. The cables 48 which are inserted within the passageways 24 may be conveniently connected with switch boxes 57 located at spaced intervals within the marginal trenches 22 and by having the trenches positioned along the margins of the floor, the conductors or cables 48 may be introduced within the passageways 24 from either side of the room depending upon the location of the apparatus which is to be served. The described arrangement or system enables the serving of apparatus with electrical conductors with the use of minimum conductor lengths. Thus it will be apparent that the invention has a very practical application in distributing conductors within larger floor slabs where a relatively large potential drop is experienced if the conductors extend across the entire width of the floor.

The described method of producing outlets is particularly applicable in connection with molded or unlined passageways. The passageways 24 being unlined, precludes the necessity of exercising extreme care in breaking through the surface of the concrete slab 21 and the necessity of introducing a particular type of fitting which would necessarily be employed if a duct or conduit had to be broken into after the upper portion of the slab had been removed and prepared or threaded to receive a fitting. In otherwords, this invention enables the expeditious molding of an outlet for an unlined passageway as distinguished from the introduction of a fitting to be directly connected with or threaded upon an embedded tube or duct. By having the angular or diagonal arrangement of the unlined passageways and the type of outlet assembly hereinbefore described, the invention presents a most economical and universal system and method of distribution in floor construction and enhances the practical utility of unlined passageways for electrical conductors. Likewise the invention may be employed to greatly facilitate the practical application of lined passageways as for example in connection with the proper arrangement of embedded conduits.

Although the invention has been described in connection with a particular type of floor construction as well as special arrangements of apparatus upon a floor area, it is to be understood that the invention is capable of numerous other applications and should be limited only by the scope of the appended claims.

What is claimed is:

1. In a distribution system, a building slab construction having a trench, and a plurality of distributive passageways molded in the slab, extending diagonally with respect to the trench and terminating therein.

2. In a distribution system, a building slab construction having a trench, and a plurality of spaced, parallel distributive passageways extending diagonally with respect to the trench and terminating therein.

3. In a system of electrical distribution, a concrete building slab having spaced trenches and a plurality of parallel passageways interconnecting the trenches and extending diagonnally with respect thereto.

In witness whereof, I hereunto subscribe my name this 16th day of February, 1929.

CLAUDE THEODORE SIEBS.